US006903050B2

(12) United States Patent
Ilinich et al.

(10) Patent No.: US 6,903,050 B2
(45) Date of Patent: Jun. 7, 2005

(54) METHOD OF PREPARATION OF NON-PYROPHORIC COPPER-ALUMINA CATALYSTS

(75) Inventors: Oleg M. Ilinich, Monmouth Junction, NJ (US); Wolfgang F. Ruettinger, East Windsor, NJ (US); Ronald T. Mentz, Erie, PA (US); Robert J. Farrauto, Princeton, NJ (US)

(73) Assignee: Engelhard Corporation, Iselin, NJ (US)

( * ) Notice: Subject to any disclaimer, the term of this patent is extended or adjusted under 35 U.S.C. 154(b) by 150 days.

(21) Appl. No.: 10/281,635

(22) Filed: Oct. 28, 2002

(65) Prior Publication Data

US 2004/0082471 A1 Apr. 29, 2004

(51) Int. Cl.[7] .............................. B01J 23/72; B01J 20/34
(52) U.S. Cl. ......................................... 502/346; 502/53
(58) Field of Search .................................... 502/346, 53

(56) References Cited

U.S. PATENT DOCUMENTS

| 3,787,332 A | | 1/1974 | Sugier ......................... 252/443 |
| 4,308,176 A | | 12/1981 | Kristiansen ................. 252/463 |
| 4,446,249 A | * | 5/1984 | Eden ........................... 502/225 |
| 4,631,266 A | * | 12/1986 | Wold et al. .................. 502/324 |
| 4,871,710 A | | 10/1989 | Denny et al. ............... 502/414 |
| 5,849,966 A | * | 12/1998 | Smith et al. ................ 585/363 |
| 6,417,136 B2 | * | 7/2002 | Cheung et al. ............. 502/330 |
| 6,448,457 B1 | * | 9/2002 | Hesse et al. ................ 568/885 |
| 6,455,464 B1 | * | 9/2002 | Chen ........................... 502/346 |
| 6,664,207 B2 | * | 12/2003 | Yao et al. .................... 502/61 |
| 2002/0061277 A1 | | 5/2002 | Ruettinger et al. ......... 423/654 |

FOREIGN PATENT DOCUMENTS

| GB | 1 131 631 | | 10/1968 | |
| WO | WO97/34694 | * | 9/1997 | ............ B01J/23/72 |

OTHER PUBLICATIONS

Catalyst Handbook 2nd Ed.; Twigg (ed.) Wolfe Publishing 1989 pp. 315–331.

* cited by examiner

*Primary Examiner*—Stanley S. Silverman
*Assistant Examiner*—Jonas N. Strickland
(74) *Attorney, Agent, or Firm*—Russell G. Lindenfeldar

(57) ABSTRACT

Provided is a process for preparing a non-pyrophoric catalyst having about 2 to 20 wt. % of a copper component, wherein at least 50 wt. % of the copper component is in the form of a copper oxide, aluminum oxide-spinel. The catalyst can be prepared by forming a mixture of a copper precursor and an alumina precursor, coextruding the mixture, drying the coextrudate and calcining the dried coextrudate at a temperature of at least 600° C. In other aspects, the invention also relates to processes for the activation of copper-based catalysts and for the regeneration of deactivated copper-based catalysts.

15 Claims, 6 Drawing Sheets

METHOD OF PREPARATION OF NON-PYROPHORIC COPPER-ALUMINA CATALYSTS

The present invention relates to non-pyrophoric copper-alumina catalysts, methods for their preparation, and methods for using the non-pyrophoric catalysts. Among other things, the catalysts are useful for catalyzing processes that produce hydrogen by reaction of carbon monoxide (CO) and water ($H_2O$). The catalysts and methods of the invention are particularly useful, for example, in generating hydrogen for gas streams supplied to fuel cells.

Fuel cells require both oxygen and a source of hydrogen to function. The oxygen can be readily obtained in pure form (i.e., $O_2$) or from the air. The low volumetric energy density of isolated hydrogen gas, however, compared to conventional hydrocarbon fuels makes the direct supply of hydrogen gas-to fuel cells impractical for most applications. Large volumes of hydrogen gas are needed to provide the equivalent amounts of energy that are stored in much smaller volumes of conventional hydrocarbon fuels such as natural gas, alcohol, oil or gasoline. Accordingly, the conversion of known hydrocarbon-based fuel stocks to hydrogen gas is an attractive source of hydrogen for fuel cells and other applications.

Hydrocarbon-based fuel stocks are converted to hydrogen and carbon dioxide by a series of conversions that typically include steam reforming and/or partial oxidation, and water-gas shift reactions. These conversions can be conducted in a fuel cell processor (also known as a fuel cell reformer).

The conversions that occur within the fuel cell processor not only produce a hydrogen stream but also lower the concentration of carbon monoxide in the hydrogen stream to levels that are acceptable for delivery to the fuel cell processor. Achieving a sufficiently low level of carbon monoxide in the hydrogen stream that is ultimately supplied to the fuel cell is important to minimize carbon monoxide-induced degradation of platinum-based electrodes in the fuel cells. The platinum electrodes are susceptible to even very low levels of carbon monoxide. Water-gas shift conversions are typically well-suited for handling the carbon monoxide concentrations of about 6–12% by volume (on a dry basis) of carbon monoxide that emerges from the steam reforming conversions. The water-gas shift reaction is a well known reaction which is used, among other things, to generate hydrogen in a gas-borne stream by chemical reaction of carbon monoxide with water vapor ($H_2O$) according to the following stoichiometry:

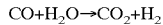

$$CO + H_2O \rightarrow CO_2 + H_2$$

The reaction generally requires a catalyst.

In fuel cell applications, water-gas shift conversions are often conducted in two stages that are fluidly connected: a high temperature stage that is conducted at temperatures of about 350–500° C., and a low temperature stage that is typically conducted at temperatures below about 300° C. Higher temperatures are favorable for water-gas shift process in terms of higher reaction rates; however, the high temperature process is limited by thermodynamic considerations. Typical catalysts employed in the high temperature stage are iron-chromium-based catalysts. Lower levels of carbon monoxide can be achieved in the low temperature shift stage than in the high temperature stage due to a more favorable thermodynamic equilibrium. Catalysts utilized in the low temperature stage of the water-gas shift reaction are typically copper-based catalysts, such as the copper-zinc-alumina catalysts as disclosed in GB 1131631.

Conventional, copper-based water-gas shift catalysts suffer from a number of liabilities. For instance, low temperature copper-zinc based water-gas shift catalysts in the reduced state undergo rapid temperature increases of about 750° C. upon exposure to atmospheric air. In many cases, such rapid and dramatic temperature increases result in the sintering of the catalyst which can permanently disable the catalyst. In addition to potential damage to the catalyst bed and associated equipment, such temperature increases raise safety concerns due to their pyrophoric nature. In industrial settings, where reaction conditions can be carefully monitored and appropriate safety controls can be put in place to prevent atmospheric air exposure, these copper-based catalysts can be safely handled. In vehicular or residential fuel cell settings, where such controls and safeguards are impractical to implement due to cost, size and weight limitations, these catalysts pose unacceptably high levels of risk.

In addition to concerns over safety considerations, conventional, pyrophoric copper-based catalysts pose an additional disadvantage. Lengthy and carefully controlled protocols are generally necessary to both activate and to passivate (stabilize toward exposure to air) the catalyst due to the exothermic nature of both the reduction and oxidation of the copper catalytic agents. Such activation and passivation protocols typically require specialized equipment, such as flow controls and heat exchange equipment.

For example, the activation of typical pyrophoric copper containing low temperature shift catalysts requires careful control of both temperature and the proportion of reducing gas (usually hydrogen) being introduced into the carrier gas (usually nitrogen or natural gas). In a typical activation procedure, a small proportion of hydrogen in a carrier gas is initially introduced to the catalyst bed at lower temperatures. The temperature of the catalyst bed is then raised incrementally to a higher intermediate temperature. When this intermediate temperature is reached the proportion of hydrogen in the carrier gas is incrementally increased. These iterations are repeated until the catalyst bed is completely reduced. Appropriate precautions must be taken to maintain the temperature below 230° C. as the copper catalyst begins to sinter above this temperature. The process is time-consuming and requires provisions for both flow and temperature control.

Likewise, appropriate controls and procedures are typically necessary to passivate the catalyst, due to the exothermic nature of the oxidation of the copper-based catalyst. In one instance, for example, passivation protocols are used to stabilize the catalyst before its use in the water-gas shift process. In this instance, the oxidation of the catalyst is partial, and optimization of the degree of the oxidation to maintain a sufficiently active and stable catalyst is of concern. In other instances, passivation procedures are used to decommission an older catalyst in order to safely discharge the old catalyst. In these instances, the oxidation of the copper-based catalyst is more complete. In typical passivation procedures, a carrier of an inert gas (typically nitrogen) is used while air is slowly introduced to increase the oxygen level in the carrier gas. The slow, stepwise increase in the proportion of air requires specialized flow controls and monitoring equipment (*Catalyst Handbook Second Edition*; Twigg, M. V., Ed.; Wolfe Publishing, 1989). The protocols and associated equipment required for these activation and passivation methods add to the cost and inconvenience of using pyrophoric, low temperature water-gas shift catalysts.

Another problem that plagues many conventional, copper-based catalysts is the gradual decline in catalytic activity in the process environment. Such a decline does not appear to involve contamination of the catalysts by foreign substances (e.g., sulfur compounds, halides etc.). While not being bound by theory, such "intrinsic" deactivation is believed to be due to certain components of the process gas, i.e., steam ($H_2O$) and carbon dioxide. The problem of intrinsic deactivation is of particular importance during startup and shutdown of water-gas shift reactors containing copper-based catalysts, where the temperature is dropped below the dew point of the input gas stream. Intrinsic deactivation can also occur gradually, whereby the levels of unconverted carbon monoxide remaining downstream from the catalyst gradually rise with time. This gradual rise in downstream carbon monoxide concentration while conducting the water-gas shift reaction is indicative of a catalytic instability found in many different copper-based, low temperature water-gas shift catalysts that operate below 220° C. In an industrial setting, where reaction conditions can be carefully controlled, appropriate controls and protocols serve to prevent the deactivating effects of low temperature steam exposure. These procedures are not easily implemented in a fuel processor suited for a vehicle or a residence where minimization of reactor volumes and weight is a major tenet of fuel cell processor design.

Improved low-temperature water-gas shift catalysts that can be operated in small-scale fuel cell processor settings (e.g., residential or vehicular settings) that do not exhibit rapid, exothermic temperature rises upon exposure to atmospheric air are desirable. In addition, low temperature water-gas shift catalysts that are more resistant to catalyst degradation in low temperature, high steam environments are also advantageous. Such catalysts should preferably maintain comparable activity to existing, commercial copper-based catalysts.

SUMMARY OF THE INVENTION

In one aspect, the invention relates to a process for preparing a non-pyrophoric catalyst having about 2 to 20 wt. % of a copper component, wherein at least 50 wt. % of the copper component is in the form of a copper oxide, aluminum oxide-spinel. Preferably, the non-pyrophoric catalyst contains at least 80 wt. % of alumina. The catalyst can be prepared by forming a mixture of a copper precursor and an alumina precursor, coextruding the mixture, drying the coextrudate and calcining the dried coextrudate at a temperature of at least 600° C., more preferably at least 650° C.

Preferably, the formation of the mixture of the copper precursor and alumina precursor is conducted by mulling a paste of hydrated alumina and an aqueous solution of a water-soluble copper salt.

In a preferred embodiment, the process includes activating the non-pyrophoric catalyst with a reducing gas stream comprising a reductant component and an inert gas at a temperature of about 150 to 300° C. The reducing gas stream is preferably substantially dry, and has a reductant component that includes hydrogen, carbon monoxide or a combination thereof.

In a preferred embodiment, the process further includes passivating the non-pyrophoric catalyst with a gas stream comprising oxygen and an inert gas at a temperature below 50° C. The gas stream used to passivate the catalyst is preferably substantially dry.

In another aspect, the invention relates to a process for activating a non-pyrophoric catalyst having about 2 to 20 wt. % of a copper component. At least 50 wt. % of the copper component is in the form of a copper oxide, aluminum oxide-spinel. The activation process includes contacting the non-pyrophoric catalyst with a reducing gas stream containing a reductant component and an inert gas at a temperature of about 150 to 300° C.; and passivating the reduced non-pyrophoric catalyst with a gas stream containing oxygen and an inert gas at a temperature below 50° C.

In a preferred embodiment of the activation process, the reducing gas stream is substantially dry and it contains hydrogen, carbon monoxide or a combination thereof. Preferably, the gas stream containing oxygen and the inert gas is also substantially dry.

In another aspect, the invention relates to a process for regenerating a deactivated copper-based catalyst. The first step of the regeneration process is conducted by contacting the deactivated copper-based catalyst at about 200 to 800° C. (catalyst bed temperature), preferably at 300 to 700° C., with a gas stream containing oxygen. Hydrogen is preferably substantially absent from the gas stream. In a second step of the regeneration process, the heated, deactivated copper-based catalyst is reduced with a reducing gas stream.

In a preferred embodiment of the regeneration process, the gas stream in which the deactivated catalyst is heated (in the substantial absence of hydrogen), is further characterized by the presence of about 3 to 21% by volume oxygen. Preferably, this gas stream is substantially dry as well.

In another preferred embodiment of the regeneration process, the reducing gas stream used to treat the deactivated catalyst after the heating step is substantially dry. The reduction is typically carried out at a catalyst bed temperature of about 150 to 300° C.

In a preferred aspect of the regeneration process, the deactivated catalyst has about 2–20 wt. % of a copper component and alumina, wherein at least 50% of the copper component is in the form of a copper oxide, aluminum oxide-spinel.

DEFINITIONS

Figure 1:
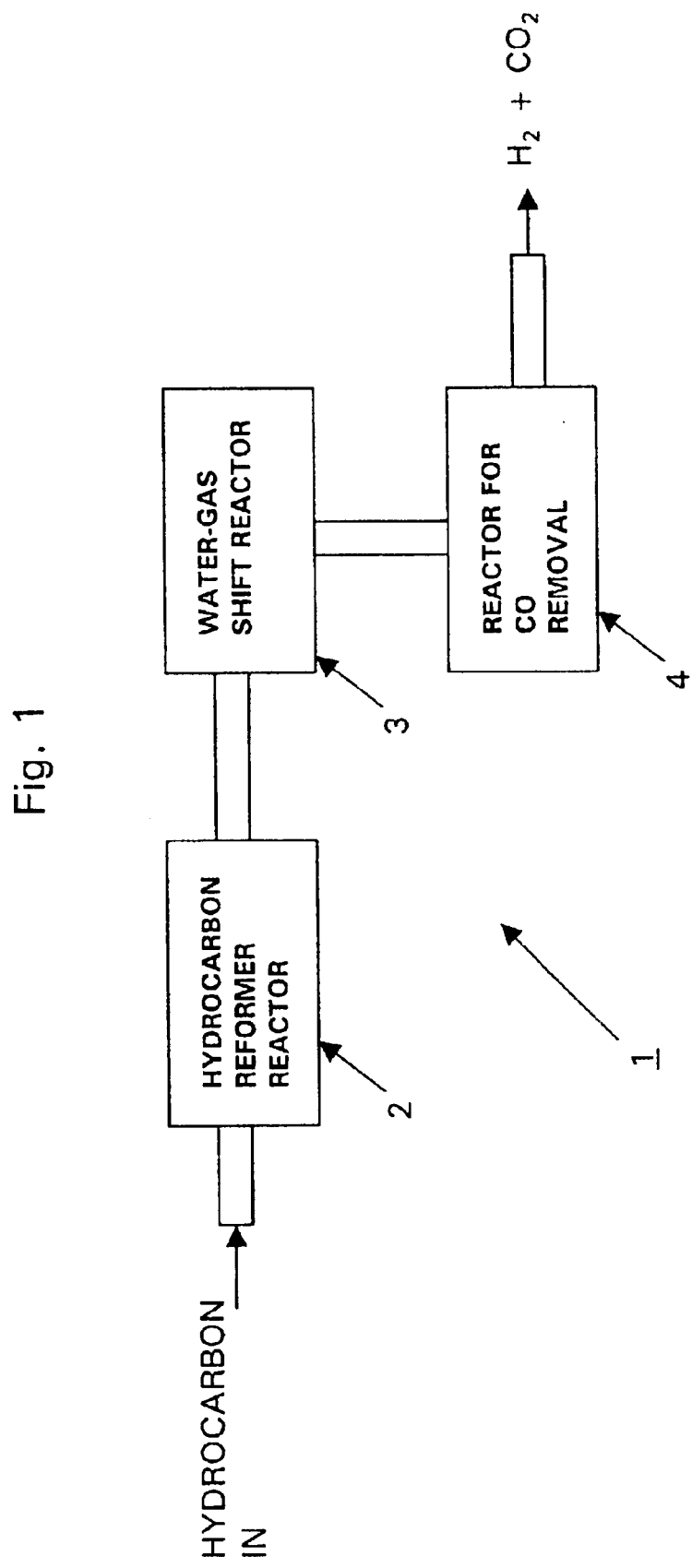
FIG. 1 depicts one embodiment of a typical fuel cell processor.

The following terms shall have, for the purposes of this application, the respective meanings set forth below.

"Aqueous solution" means a solution containing water in an amount of 30% or more by volume.

"BET surface area" means the Brunauer, Emmett, Teller method for determining surface area by $N_2$ adsorption.

Unless otherwise specifically stated, all references herein to the surface area refer to the BET surface area.

"Copper-based catalyst" refer to catalyst compositions that contain copper as a catalytic agent, preferably in an amount of 2 wt. % or more, more preferably at least 5 wt. % or more.

"VHSV" means volume hourly space velocity; that is, the flow of a gas in liter per hour per liter of catalyst volume at standard temperature and pressure.

"Weight percent" (or wt. %) refers to the amount of a catalyst component (e.g., component) relative to the total weight of the catalyst composition. The wt. % of the copper component is determined on the basis of the formula weight of copper metal. As used herein, the wt. % of alumina is specified on the basis of the theoretical amount of alumina ($Al_2O_3$) that would be formed from a given proportion of alumina precursor, if all of the alumina precursor is converted to $Al_2O_3$.

DETAILED DESCRIPTION OF THE INVENTION

The invention provides a non-pyrophoric and durable catalyst that effectively promotes the water-gas shift reaction. The catalyst is a copper-based composition that is substantially resistant to low temperature, high steam environments that often occur as a result of variable power demands that are typical of fuel cell usage in, for example, vehicular or residential settings. Such variable power demands are often associated with fuel cell processor startups and shutdowns. The invention also provides reliable methods for preparing these water-gas shift catalysts.

The catalyst composition includes a coextruded mixture of a copper component and alumina. The terms "copper component," as used herein, means copper (metal) and/or oxides thereof. The composition preferably contains about 2–20 wt. % of a copper component. Preferably at least 50% of the copper component is in the form of a copper oxide, aluminum oxide-spinel.

The catalysts of the invention are substantially less pyrophoric upon exposure to air than conventional, copper-based catalysts, such as copper-zinc water-gas shift catalysts. This property makes the catalysts of the invention desirable, for example, for implementation in fuel cell processors where minimizing the risk of an exothermic temperature rise is of particular concern. Moreover, the non-pyrophoric nature of the inventive catalysts improves the overall convenience of their handling. For example, the catalysts of the invention can be more easily regenerated than conventional copper-based catalysts if they are deactivated. In addition, more convenient and reliable methods for catalyst activation and passivation can be used than for conventional, copper-based low temperature water-gas shift catalysts.

In addition to their desirable non-pyrophoric nature, the catalysts of the invention show a surprising resistance to conditions that more rapidly degrade the activity of conventional, copper-based water-gas shift catalysts. The catalysts of the invention are less prone to deactivation due to exposure of the catalysts, for example, to high steam (e.g., above about 10% by volume), low temperature environments (e.g., below 120° C.). As was mentioned above, such conditions often accompany operation of fuel cell processors that are operated with frequent startups and shutdowns. Such operation is typical of residential or vehicular applications of fuel cells and fuel cell processors, where power demands may vary significantly. The improved resistance of the catalysts of the invention to such conditions relative to conventional, copper-based water-gas shift catalysts improves the operational lifetime of such catalysts, and decreases the frequency of catalyst replacement.

The improvements in the non-pyrophoric properties and the durability of the catalysts of the invention are not achieved at the expense of poor water-gas shift catalytic activity. In one embodiment, the catalysts of the invention are therefore desirable for replacement of conventional copper-based catalysts in the low temperature water-gas shift stage (vide supra) of the fuel cell processor.

As discussed above, the catalysts of the invention include a copper component on an alumina support. The catalysts generally contain about 2–20 wt. %, and more preferably 5–15 wt. % of a copper component. Lower levels of copper component than those specified can result in a composition that has insufficient catalytic activity. Higher levels of copper component than those specified are less preferred due to the increased pyrophoric liability associated with higher copper loadings, and do not increase the catalytic activity.

At least some, and preferably at least 50%, of the copper component in the composition is in the form of the copper oxide, aluminum oxide-spinel. As will be readily apparent to those of skill in the art, copper oxide, aluminum oxide-spinel has the general formula $CuAl_2O_4$. Compositions containing such spinel structures can be readily detected using well-known spectroscopic techniques such as by determination of X-ray diffraction patterns. While not being bound by theory, it is believed that the spinel structure in the catalyst enhances the catalyst's carbon monoxide conversion activity and contributes to the improved durability of the catalysts in high steam, low-temperature environments relative to copper-based catalysts where the spinel structure is absent.

Preferably, the composition contains at least 80 wt. % of alumina, and more preferably at least 85 wt. %. Higher proportions of alumina provide the catalysts with a higher overall heat capacity to contribute to the reduced pyrophoric liability that characterizes the catalysts of the invention. Alumina has a higher specific heat capacity than many other common components of catalyst compositions. The alumina utilized in the invention is preferably activated alumina. As used herein, the terms "activated alumina" refer to a high BET surface area alumina, for example, an alumina having a surface area greater than 10 $m^2/g$, preferably greater than 100 $m^2/g$. The activated alumina is composed of one or more of gamma, theta and delta aluminas.

Other catalyst additives can be included the composition such as promoters and stabilizers. These additional catalyst additives are typically present in less than 10 wt. %, preferably less than 5 wt. %, and more preferably less than 2 wt. % to ensure that the catalyst has a sufficient proportion of alumina to abate any temperature rises due to changes in the copper component's oxidation state. Typical catalyst additives include porous structure modifiers that are decomposed and volatilized during the calcination process. Such porous structure modifiers include, for example, wood flour.

The catalysts are prepared by a coextrusion procedure. A mixture of a copper precursor, an alumina precursor and an aqueous solvent are combined in a fashion to adequately disperse the copper precursor and the alumina precursor to form a paste. As used herein, the terms "copper precursors" refer to copper compounds such as salts or complexes that are water-soluble or water-dispersible that upon calcination form copper, an oxide of copper or mixtures thereof. It should be noted that the copper precursors can form copper oxide, aluminum oxide-spinel in the presence of an alumina precursor upon calcination at temperatures above 600° C.

Preferred copper precursors include copper nitrate, -acetate, -carbonate, -formate and -lactate.

The terms "alumina precursor" refer to aluminum compounds that upon calcination form aluminum oxide (also known as "alumina"), and in the presence of a copper precursor also form copper oxide, aluminum oxide-spinel. Preferred aluminum precursors are water-insoluble compounds such as hydrated forms of aluminum oxide e.g., boehmite, gibbsite, hydrargillite, bayerite, nordstrandite and diaspore.

The copper precursor is preferably mixed with an insoluble alumina precursor. Conducting the mixing of the copper precursor with the alumina precursor in this fashion, as opposed to using other techniques such as formation of mixed metal oxides, ensures that substantially all of the copper component is supported on alumina particles. This morphology ensures efficient heat transfer from copper components on to the alumina which has a higher specific heat capacity than does the copper component. In addition, the composition's morphology prevents unwanted sintering of copper particles which can occur if the copper particles are inadequately supported.

In contrast, precipitating or gelling mixtures of mixed metal oxides formed from soluble alumina and soluble copper precursors often results in copper and alumina particles that are formed simultaneously. As a result, such mixed metal oxides are characterized by a morphology where the alumina and copper particles are of similar size and a significant proportion of the copper component is in the form of discrete particles. As such, this proportion of the copper component is unsupported by the alumina, and therefore, the efficient heat transfer between the copper component and alumina cannot be achieved.

The mixing of the copper precursor and the insoluble alumina precursor can be conducted by any means that achieves uniform dispersion of the copper precursor on to the alumina precursor. In the extrusion step, the paste is pressed through a die of the desired shape and size to form the coextrudate. The coextrudate is then dried, typically at temperatures of about 80–120° C.

The dried coextrudate is then heated to a temperature of at least 600° C. in an oxidizing atmosphere such as air. Calcination temperatures of at least 600° C. ensure that the higher proportions, e.g., at least 50% of the copper component are actually in the form of a copper oxide, aluminum oxide-spinel. The calcination is typically conducted in the range of 600 to 900° C., and preferably in the range of about 650 to 800° C. Preferably, the calcined coextrudate has an effective size not exceeding 5 mm in length, wherein the terms "effective size" means the minimum dimension (i.e., diameter or length, whichever is less) in the coextrudate particle.

While not being bound by theory, it is believed that both the coextrusion step and the higher temperatures used in the calcination step contribute to the high mechanical strength of the finished catalyst. The high mechanical strength makes the catalyst more resistant to vibrational forces and other wear mechanisms. These steps also contribute to improved resistance to high steam, low temperature environments and reduced pyrophoricity.

The catalysts of the invention are preferably activated (reduced) and then passivated (stabilized) before being subjected to the process gas containing carbon monoxide and steam. In the activation step the catalysts are exposed to a reducing gas stream that is composed of a dilute mixture of a reductant component and in an inert gas (e.g., nitrogen) at temperatures of about 150 to 300° C. Other gases, such as methane or carbon dioxide and combinations thereof, that the catalyst is substantially unreactive with can also be used to dilute the reductant component. The reductant component can be, for example, hydrogen, carbon monoxide or a combination thereof Preferably, the dilute mixture is composed of about 20% by volume or less of the reductant components. Preferably, the reducing gas is substantially dry. As used herein when referring to gas streams the terms "substantially dry" refer to gas streams that contain less than 5% and preferably less than 1% by volume of water.

In the next step, the reduced catalyst is passivated by contacting the reduced catalyst with a gas stream containing oxygen. The composition of the gas stream used in the passivation step is preferably enriched in oxygen by incrementally diluting the inert gas with increasing proportions of oxygen (e.g., from air) while maintaining the temperature of the catalyst below about 50° C. (e.g., room temperature). Here again, the gas stream is preferably substantially dry. This technique forms a thin oxide film on the surface of catalytically active clusters in the extrudate, and preserves most of the copper component in the reduced (metallic) state in the interior of the clusters. It is believed that the minimization of the oxide layer's thickness facilitates fuel processor startup and contributes to the catalyst's durability with respect to catalyst activity in high steam, low temperature environments. Higher passivation temperatures result in complete reoxidation of the copper component to $Cu^{2+}$. Such fully oxidized catalyst is prone to a more rapid deactivation in high steam, low temperature process environments. Catalyst passivation can be used as an additional safety precaution that further decreases the operational risk due to overheating of the catalyst due to exposure to air after the catalyst is reduced.

The catalysts of the invention that are activated and subsequently passivated as described above during the course of manufacturing are more easily handled than conventional copper-based, water-gas shift catalysts. The catalysts of the invention can be shipped to the site where they are to be used, and can be quickly activated by a relatively brief exposure to a reducing gas (e.g., containing hydrogen, carbon monoxide or both), preferably a dry process gas. In contrast, conventional copper-based water-gas shift catalysts, due to their pyrophoricity, are typically shipped in their oxide form and typically require the end user to perform slow stepwise reduction protocols before being exposed to the process gas. In addition, conventional copper-based water-gas shift catalysts require the end user to use lengthier passivation protocols when discharging the catalyst from the reactor.

Depending on the reaction conditions, copper-based water-gas shift catalyst often gradually decrease in catalytic activity due to secondary chemical processes that slowly modify the surface of the catalyst. Reaction conditions that contribute to the gradual deactivation of copper-based catalysts include exposure to high steam, low temperature environments in the presence of carbon dioxide. The activity of the catalysts of the invention can be conveniently restored in situ by regeneration processes to levels that are substantially the same as the initial catalytic activity. Such processes do not require sophisticated temperature and flow controls, nor are they burdensome in terms of the time needed for the restoration of the catalytic activity.

In addition to being useful for the catalysts of the invention, the regeneration procedures described herein are useful for any copper-based catalyst that is non-pyrophoric. For example, the non-pyrophoric copper-based catalysts described in copending U.S. patent application Ser. No. 09/771,812, filed Jan. 29, 2001 can be regenerated using the regeneration methods of the invention. However, the convenient regeneration procedures described herein are unsuitable for copper-based catalysts that are pyrophoric, such as the copper-zinc-alumina catalysts as disclosed in GB 1131631. Pyrophoric copper-based catalysts undergo a dangerously high oxidative temperature rise (ca. 700° C.) upon exposure of the catalyst to oxygen (e.g., air). Such temperature rises may cause thermal damage of the reactor, and deactivate the catalyst due to sintering at high temperatures.

Preferably, the non-pyrophoric copper-based catalysts that are to be regenerated exhibit an oxidative temperature rise of no more than 200° C. upon exposure of the reduced catalyst to air. Preferably, the copper-based catalysts contain a support with a heat capacity of at least 0.8 J/g·K, and the catalysts contain at least 75 wt. % of the support.

In a preferred regeneration procedure, the deactivated catalyst is first contacted with a gas stream having a composition that contains oxygen, and where hydrogen is substantially absent. The temperature of the catalyst bed is generally maintained at about 200–800° C., preferably about 300–700° C. during the first stage of the regeneration procedure. This catalyst bed temperature can be achieved by providing an external source of heat, or by contacting the deactivated catalyst with a gas stream comprising oxygen (preferably at least 3% by volume) wherein hydrogen is substantially absent. The ensuing oxidation of the copper-based catalyst is exothermic, and typically additional provisions for heating of the catalyst bed are unnecessary for the catalyst bed to achieve temperatures of 200–800° C.

In reference to gas streams in which the regeneration of the catalyst is conducted, the terms "wherein hydrogen is substantially absent," as used herein, means less than 0.5% by volume. Such gas streams preferably contain an oxidizing component such as oxygen which may be conveniently provided in the form of air. Preferably, there is about 3 to 21% by volume of oxygen ($O_2$) in the gas stream. In addition, the gas stream is preferably substantially dry. The endpoint of this stage of the regeneration process can be determined by measuring the concentration of the carbon dioxide in the outlet gas stream, which should not exceed the concentration introduced with the air feed.

At this point, the catalyst is exposed to a reducing gas stream while maintaining the catalyst bed temperature at about 150 to 300° C. While the reducing gas stream can be untreated (wet) reformate gas stream, it is preferred that the reducing gas stream is substantially dry in order to restore the maximum amount of activity in the catalyst. Such a dry, reducing gas stream can contain a reductant component which can be hydrogen, carbon monoxide or a combination of the two. The gas stream employed in the reduction step can contain high proportions of the reductant component to rapidly reduce the catalyst bed. For instance, undiluted hydrogen gas can be employed as the reducing gas stream. Another source of the reductant gas stream is, for example, dried reformate gas. Rapid introduction of higher proportions of hydrogen gas cannot practically be achieved using conventional copper-based catalysts due to the resulting exotherm that would accompany the reduction of the catalyst. The endpoint for the reducing gas consumption can be determined by gas analysis of the outlet gas stream or temperature vs. time profiling of the catalyst bed. Either the end of the consumption of the reducing gas or the end of the catalyst bed temperature rise signifies reduction completion.

The invention also relates to processes for using the catalysts of the invention. In a preferred embodiment, the catalysts of the invention are implemented in processes for producing hydrogen via the water-gas shift reaction. For example, the catalysts of the invention can be incorporated in a reactor that is charged with an input gas stream containing carbon monoxide and steam to produce hydrogen and carbon dioxide as products in the output gas stream.

The composition of the input gas stream for the process can vary depending on the source of the reactant carbon monoxide. Although higher proportions of carbon monoxide can be accommodated in the process, the process of the invention is particularly effective where the carbon monoxide concentration is less than about 15% by volume. Typically, molar excesses of steam are used relative to the amount of carbon monoxide present in the input gas stream. Generally, $H_2O:CO$ molar ratios of between 1:1 (i.e., "1.0") and 20:1 (i.e., "20.0") are preferred in the input gas stream, with higher ratios being particularly preferred for high conversion of carbon monoxide.

In fuel cell applications of the inventive process, input gas streams typically contain at least 10% by volume of hydrogen in addition to the carbon monoxide and steam. Higher volumes, e.g., greater than 30–40% by volume, are often utilized in fuel cell applications.

In addition to carbon monoxide, steam and hydrogen, the input gas stream can contain carbon dioxide, nitrogen, and minor amounts of olefins, alcohols, aldehydes and/or other hydrocarbons. Preferably, the input gas stream contains about 4–5% or less by volume of hydrocarbons and about 25% or less by volume of carbon dioxide.

Operating temperatures for the processes of the invention are about 150 to 350° C., with preferred operating ranges of about 200 to 300° C. The optimal temperature ranges make the catalysts of the invention well-suited for incorporation into low-temperature water-gas shift reactors in fuel processors. The catalysts of the invention may be used, for example, in place of conventional, low temperature copper-zinc-based catalysts such as $CuO/ZnO/Al_2O_3$ which typically operate at about 200° C. It should be noted that lower temperatures could also be used, for example, when lower equilibrium carbon monoxide concentrations in the outlet gas stream are desired.

Reaction zone pressure is preferably maintained below the dew point pressure of the reaction mixture. It should be recognized that lower or higher reaction zone pressures can be used, such as from atmospheric up to about 500 psig.

Preferably, the water-gas shift reaction process is carried out in a continuous mode with the reactants being passed over the catalyst which is contained in one or more reaction zones. Gaseous hourly space velocities of about 10 to about 10,000 $hr^{-1}$ VHSV measured on the basis of dry gas under standard conditions are typical of the processes of the invention that suitable for most fuel cell operations. Preferred gaseous hourly space velocities are from 500 to 3000 $hr^{-1}$ VHSV.

Although the water-gas shift catalysts and processes of the invention can be used in any application where hydrogen production is needed, a particularly useful application is in apparatus such as fuel processors that supply hydrogen to fuel cells. These systems are typically composed of a series of reactors that convert hydrocarbon fuels (e.g., natural gas, gasoline, fuel oil, liquid petroleum gas, and the like) into hydrogen fuel. As mentioned above, the conversions that take place in the reactors typically include reforming reactions and water-gas shift reactions to produce hydrogen. Other reactors and trapping devices can also be included in the apparatus that reduce unwanted components in the hydrogen feed streams (e.g., carbon monoxide and sulfur components), that are ultimately supplied to the fuel cell.

As illustrated in the fuel processor (1) of FIG. 1, the hydrocarbon reformer reactor (2) converts hydrocarbons (e.g., methane) and steam into hydrogen, carbon monoxide and carbon dioxide. For example, methane is converted by the two reactions below:

$$CH_4 + H_2O \rightarrow 3H_2 + CO$$

$$CH_4 + 2H_2O \rightarrow 4H_2 + CO_2$$

The resulting gas is then reacted in the water-gas shift reactor (3) to further enrich the process gas in hydrogen, through the reaction of carbon monoxide with steam. Residual carbon monoxide in the process is then removed by selective oxidation of carbon monoxide (with minimal hydrogen consumption) to form carbon dioxide in the preferential oxidation reactor (4) according to the reaction:

$$CO + \tfrac{1}{2}O_2 \rightarrow CO_2.$$

The resulting process stream containing high levels of hydrogen is then supplied to the fuel cell.

The following examples further illustrate the present invention, but of course, should not be construed as in any way limiting its scope. In the examples, the concentrations of the components of the gas composition are specified in terms of percent or parts-per-million (ppm) by volume.

EXAMPLE 1

Preparation of a 10.5 wt. % Copper on Alumina Catalyst (Catalyst A1)

Alumina monohydrate powder (255 g, Pural® SB available from Condea, which was confirmed by XRD analysis to have the boehmite structure) was thoroughly mixed with solution of reagent grade $Cu(NO_3)_2 \times 2\ H_2O$ (93.4 g) in water (280 mL) until a uniform light blue paste was obtained. The paste was extruded through a 1.6 mm diameter dye opening, then dried in air for 4 hours at 120° C. followed by calcining at 750° C. for 4 hours in air. After calcination, 243 g of green colored extrudates were obtained.

This catalyst is referred to herein as "Catalyst A1" which contained 10.5 wt. % copper component.

Catalyst A1 was further reduced by heating it to a maximum of 250° C. while purging it with a mixture of hydrogen and nitrogen. The concentration of hydrogen in the gas mixture was gradually increased from 1% to 7%. The endpoint of the reduction step was determined by monitoring hydrogen concentration in the gas stream exiting the catalyst bed, and monitoring the bed temperature. The end of hydrogen consumption and subsidence of the reduction exotherm in the catalyst bed signified the completion of the reduction.

The reduced Catalyst A1 was purged, with pure nitrogen while cooling it down to room temperature. Catalyst A1 was stabilized by purging it with a mixture of air and nitrogen in such a way that the exotherm due to the oxidation was minimized. The stabilization was achieved by gradually increasing the concentration of air in the gas mixture from 0.3% to 10%. The endpoint of the stabilization step was determined by monitoring oxygen concentration in the gas stream exiting the catalyst bed, and the bed temperature. The end of oxygen consumption and subsidence of the exotherm due to the oxidation in the catalyst bed signify the end of the stabilization.

After reduction and stabilization, Catalyst A1 was insensitive to exposure to 100% air, and therefore safe with respect to handling and transportation. According to X-ray photospectroscopy (XPS) analysis, the reduced and stabilized catalyst contained copper both as low-valent species ($Cu^0$ and/or $Cu^{1+}$) and $Cu^{2+}$, while before reduction and stabilization the only form of copper present in the catalyst is $Cu^{2+}$.

EXAMPLE 2

Comparative Evaluation of Catalyst Pyrophoricity of the 10.5 wt. % Copper on Alumina Catalyst (Catalyst A1) a 12 wt. % Copper-Chromia-Alumina Catalyst (Catalyst B1) and a Commercial Copper-Zinc-Alumina Catalyst (Catalyst C1)

The magnitude of the temperature rises that occurred upon exposure of the reduced catalyst were compared between Catalyst A1 and two reference catalysts.

One of the reference catalysts was a 12 wt. % copper 0.45 wt. % chromia on alumina catalyst which was calcined at 500° C. Such catalysts are described in copending U.S. patent application Ser. No. 09/771,812, filed Jan. 29, 2001, which is herein incorporated by reference. This reference catalyst is referred to herein as "Catalyst B1".

The other reference catalyst was a commercial copper-zinc-alumina catalyst available from United Catalysts International (UCI), herein referred to as "Catalyst C1". Typical copper/zinc based low temperature water-gas shift catalysts contain about 33 wt. % CuO, about 35–55 wt. % ZnO, with the balance being $Al_2O_3$ (Catalyst Handbook; Twigg, M. V., Ed.; Wolfe Publishing, 1989, p 312).

Measurements were conducted using a 1 inch micro-flow reactor containing 40 cc of catalyst per experiment. The feed gas composition had a dry gas composition containing 8% CO, 10% $CO_2$, 43% $H_2$ and the balance was $N_2$. Steam (26% v/v) was added as a reactant. The dry gas flow rate was 1.5 standard liters per minute (SLPM) which corresponded to wet space velocity of 3040 $h^{-1}$. The catalytic activity of the catalysts were determined at 200 and 250° C.

The catalyst was heated in the presence of the above-described feed gas composition to 200° C. for 2 h and then heated to 250° C. for 2 hours. The catalyst was then cooled to 100° C. or 150° C. The reactor Was then purged with nitrogen. Following this step, the reactor was purged with air and the temperature at the reactor outlet was monitored to record the temperature rise (exotherm of oxidation). The reactor was then purged with nitrogen again and the original feed gas composition was introduced into the reactor. The cycle was repeated.

Figure 2:
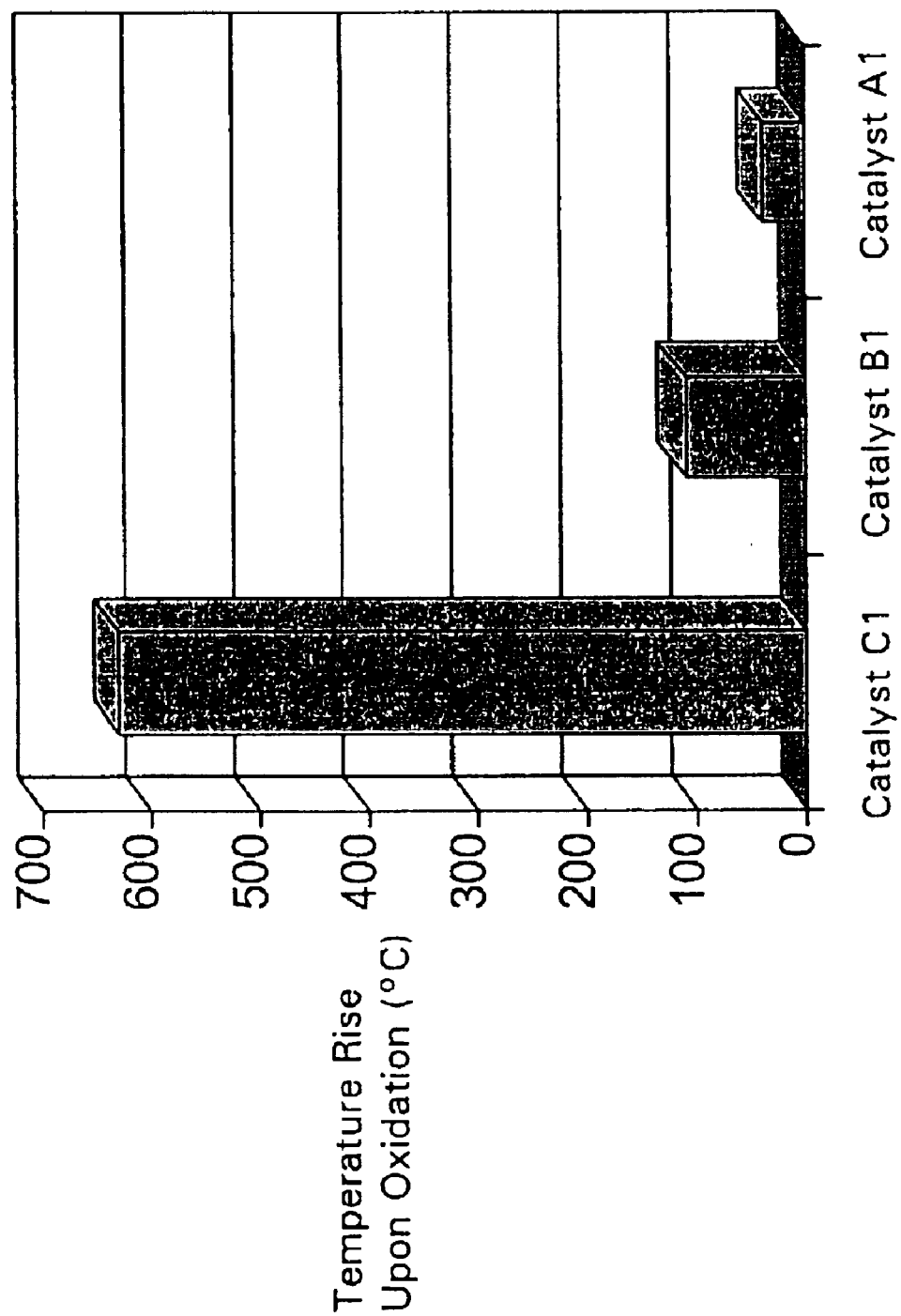
FIG. 2 graphically displays the oxidative temperature rise that occurs upon exposure of reduced copper-based catalysts to air.

The results of the experiment are graphically displayed in FIG. 2. As can be seen in the graph, exposure of the reduced reference catalyst, Catalyst C1 to air resulted in a temperature increase of about 600° C., while exposure of the other reference catalyst, Catalyst B1, resulted in a temperature increase of about 100° C. In contrast, exposure of reduced Catalyst A1 to air resulted in a temperature increase of less than 50° C.

EXAMPLE 3

Comparative Evaluation of Catalyst Lifetime of the 10.5 wt. % Copper on Alumina Catalyst (Catalyst A1) vs a Reference Catalyst in Simulated High Steam/Low Temperature Conditions The following example measures the catalyst lifetime under its main degradation condition: reactor startups and shutdowns with catalyst flooding due to steam condensation. The objective of the study was to determine the catalyst lifetime presuming the main degradation mechanism is exposure of the catalyst to the reaction environment together with thermal cycling of the catalyst which includes steam condensation. The catalysts evaluated in the experiment included Catalyst A1 (see Example 1) and a reference catalyst, Catalyst B1 (a 12 wt. % copper 0.45 wt. % $Cr_2O_3$ alumina catalyst (see Example 2).

The study was conducted using microflow reactors controlled by a microcomputer that are run continuously. 50 cc of catalyst was loaded into a 1" ID tubular microflow reactor. A feed gas was introduced containing (on a dry basis) 6.3% CO, 11% $CO_2$, 43% $H_2$ and 39.7% $N_2$. Steam was added in an amount sufficient to yield a feed gas composition containing 37% steam. The flow rate of the feed gas was 1.5 standard liters per minute (SLPM). This flow rate corresponded to a space velocity of 1800 $h^{-1}$ on a dry basis or a volume hourly space velocity (VHSV of 2857 $h^{-1}$ on a wet basis.

The catalyst was subjected to the following temperature profile during the run: 220° C. inlet temperature for 2 h, then cool down to 70° C. within 120 minutes. Hold at 70° C. for 5 minutes, then heat back to 90° C. in 30 minutes and to 220° C. in 60 minutes.

The catalyst activity was characterized by the CO outlet concentration at an inlet temperature of 220° C. measured with an on-line infrared gas analyzer ZRH (Fuji Electric, Japan). The results of the experiment are graphically represented in FIG. 3.

Figure 3:
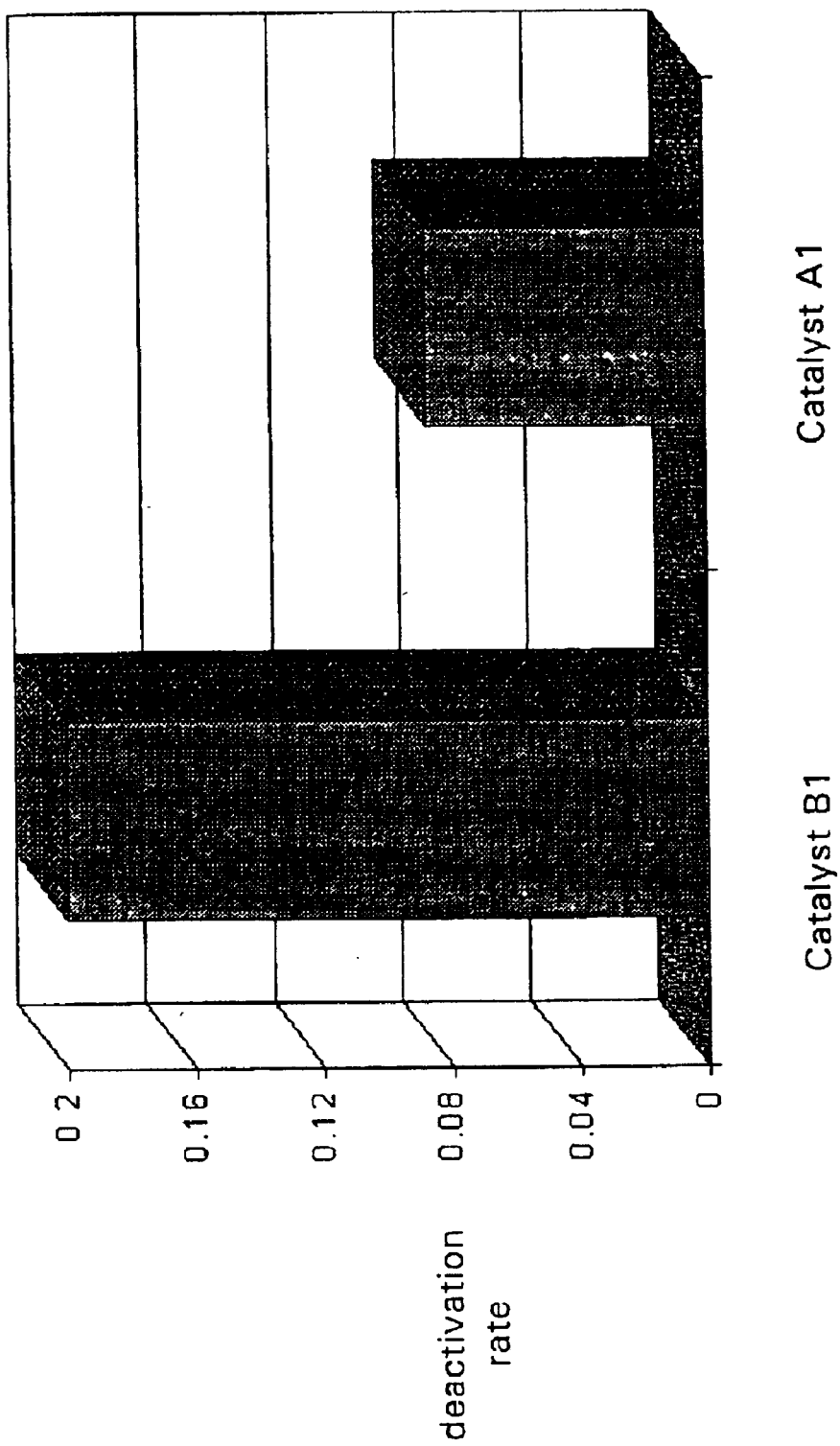
FIG. 3 graphically displays a comparison of the deactivation rates for copper-based catalyst in conditions that mimic reactor startups and shutdowns.

As can be seen in FIG. 3, the deactivation rate for Catalyst A1 is less than half the deactivation rate for Catalyst B1 under the conditions tested. Catalyst A1 therefore has a greater durability under the conditions tested.

EXAMPLE 4

Evaluation of the Effect of the Calcination Temperature on the Catalytic Activity of the 10.5 wt. % Copper on Alumina Catalyst The effect of the calcination temperature on the catalytic activity of a 10.5 wt. % copper on alumina catalyst was determined in this example. The catalysts were prepared according to Example 1, except that the calcination temperatures were varied between 500° C. to 750° C.

| Catalyst | Calcination Temperature |
| --- | --- |
| Catalyst A1 | 750° C. |
| Catalyst A2 | 650° C. |
| Catalyst A3 | 500° C. |

The activity measurements were conducted in a microflow reactor according to the following procedure:

4 g of Catalyst A1 was loaded into a 1" ID microflow reactor. A dry feed gas was introduced at a flow rate of 0.5 SLPM. This flow rate corresponded to a VHSV of 7500 $h^{-1}$ on the basis of the dry gas composition (or later after steam was introduced to a VHSV of 10,150 $h^{-1}$ on the basis of the wet gas composition. The feed gas contained 8% CO, 10% $CO_2$, 43% $H_2$, and 39% $N_2$ (on a dry basis). The activity test included heating the catalyst in the dry feed gas at temperatures ramping up from ambient to 200° C. at 5° C./min, followed by cooling down to about 160° C. After initial heating with the dry feed gas, steam was added to initiate the water-gas shift reaction. Steam was added in a proportion to result in a feed gas composition that contained 26% steam.

The catalyst performance was characterized by constantly monitoring CO concentration at the reactor outlet with an on-line infrared gas analyzer ZRF (Fuji Electric, Japan). During the experiment the catalyst bed temperature was ramped up to 300° C. at a rate of 2° C./min.

Figure 4:
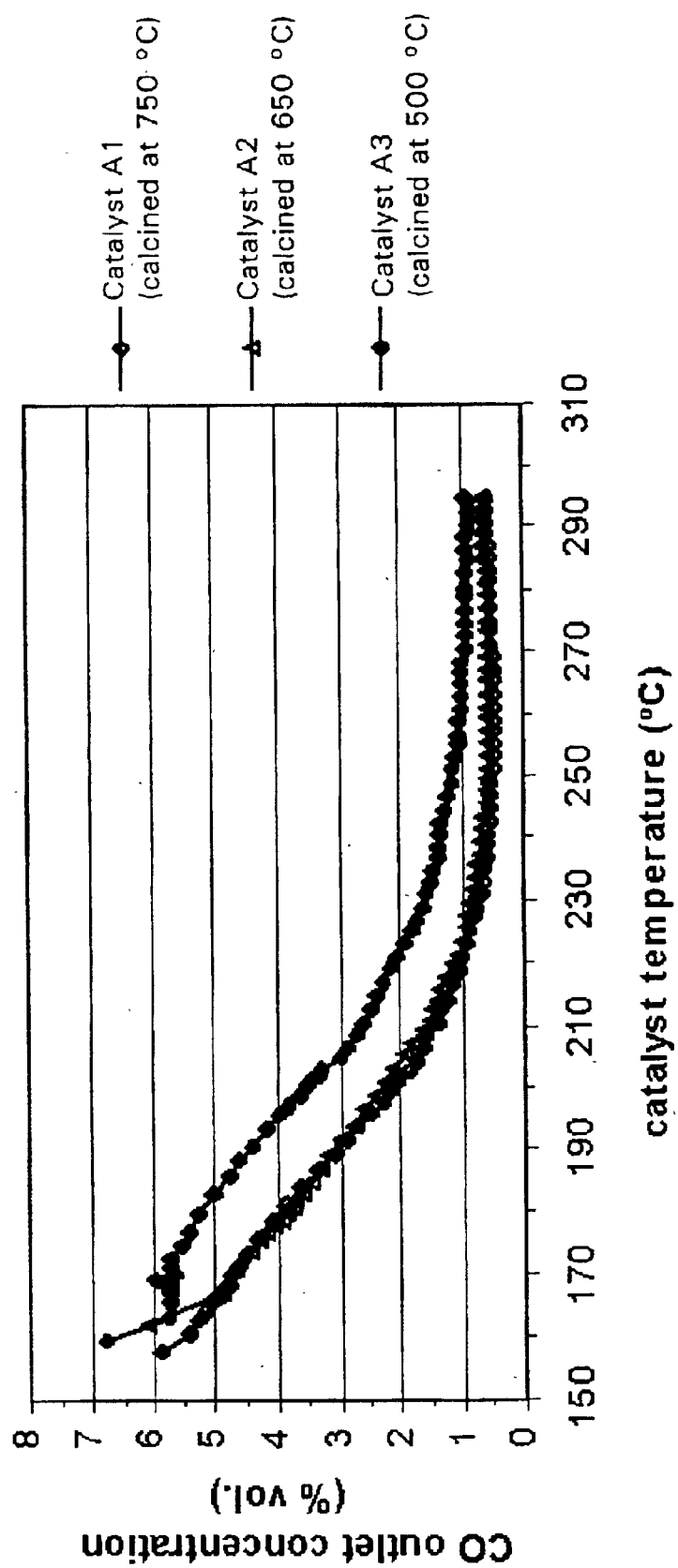
FIG. 4 displays the outlet carbon monoxide concentrations obtained upon exposure of a reformate gas stream to various copper-based catalysts prepared using different calcination temperatures as a function of catalyst temperature.

The results of the experiment are graphically displayed in FIG. 4. As can be seen, Catalyst A1 and A2 which were calcined at higher temperatures, are more active than Catalyst A3 which was calcined at a lower temperature (500° C.).

EXAMPLE 5

Spectroscopic Identification of the Copper Oxide Aluminum Oxide-Spinel Structure in Catalyst Compositions Copper on alumina catalysts containing variable amount of copper were prepared according to Example 1, except that the calcination temperature was 650° C. The X-ray diffraction patterns were determined on a Philips 3710 difractometer in $CuK\alpha$ radiation.

| Catalyst | wt. % copper component |
| --- | --- |
| Catalyst A4 | 0 |
| Catalyst A5 | 2 |
| Catalyst A6 | 5 |
| Catalyst A7 | 10 |

Figure 5:
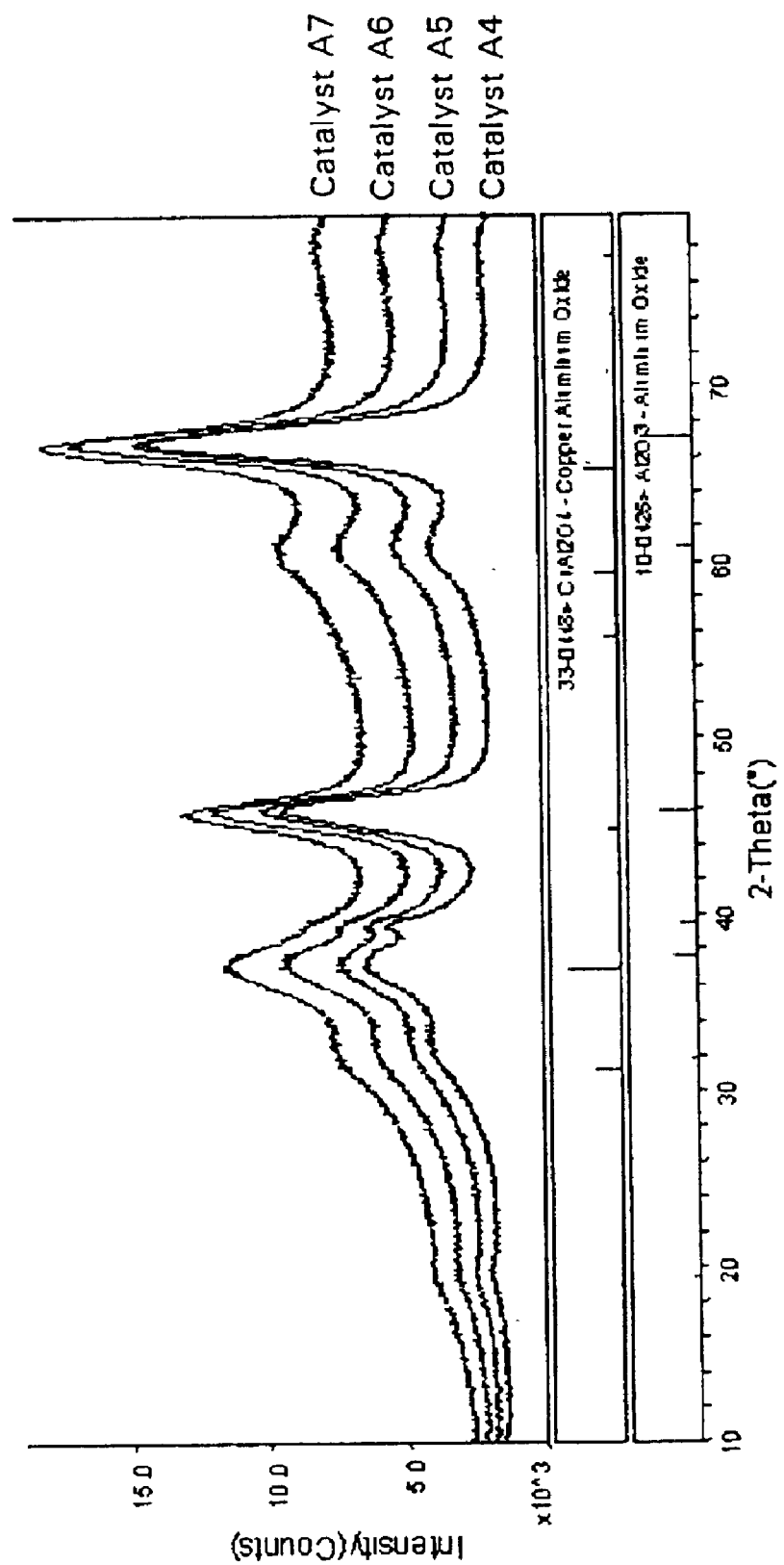
FIG. 5 shows X-ray diffraction patterns for four copper-based catalysts prepared using different calcination temperatures.

The overlaid X-ray diffraction patterns (XRD) patterns generated for each of the compositions is shown in FIG. 5. As can be seen in the figure, changes in the XRD pattern at about $2\theta=37°$ are indicative of the spinel structure.

EXAMPLE 6

Regeneration of the 10.5 wt. % Copper on Alumina Catalyst (Catalyst A1)

In this example, the procedure for the regeneration of an aged sample of Catalyst A1 is demonstrated. In addition, the water-gas shift activity of the regenerated sample is compared with the activities of an aged sample of Catalyst A1 and a fresh sample of Catalyst A1 (see FIG. 6).

The catalytic activity of the Catalyst A1 is stable for a long period of time under steady-state process conditions. Repeated start-stops of the fuel reformer, however, can lead to a decrease in the activity. While not being bound by theory, it is believed that decrease in catalytic activity is due to the formation of surface species which involve copper, carbon dioxide and steam, and which, once formed, decrease the amount of copper actively participating in the catalytic cycle. Catalyst A1 suffering from this type of deactivation (which is typical for fuel processors operating with frequent start-stops) can be fully regenerated via the procedure described below.

Two samples of Catalyst A1 were aged as described in Example 3. One sample of the aged catalyst served as a reference catalyst in the catalyst activity measurements described below (referred to as "Aged" in FIG. 6). The other sample of the aged catalyst was regenerated by heating in air at 300° C. (catalyst bed temperature) for 2 hours. Completion of the regeneration procedure (i.e., reduction) was achieved during the activity measurement protocol by exposure of the oxidized catalyst to the dry feed gas containing 8% CO, 10% CO$_2$, 43% H$_2$ and 39% N$_2$ while heating the sample at temperatures ramping up from ambient to 200° C. at 5° C./min, followed by cooling down to about 160° C. The catalytic activity for the regenerated sample is referred to as "Regenerated" in FIG. 6.

The catalytic activity was characterized by measurements performed as described in Example 4, wherein the catalysts were exposed to a dry feed gas, followed by introduction of steam in the feed gas. The results of the activity measurements are graphically displayed in FIG. 6. Activity measurements for a fresh sample of Catalyst A1 was included in graph for comparative purposes (whose activity is referred to as "Fresh").

Figure 6:
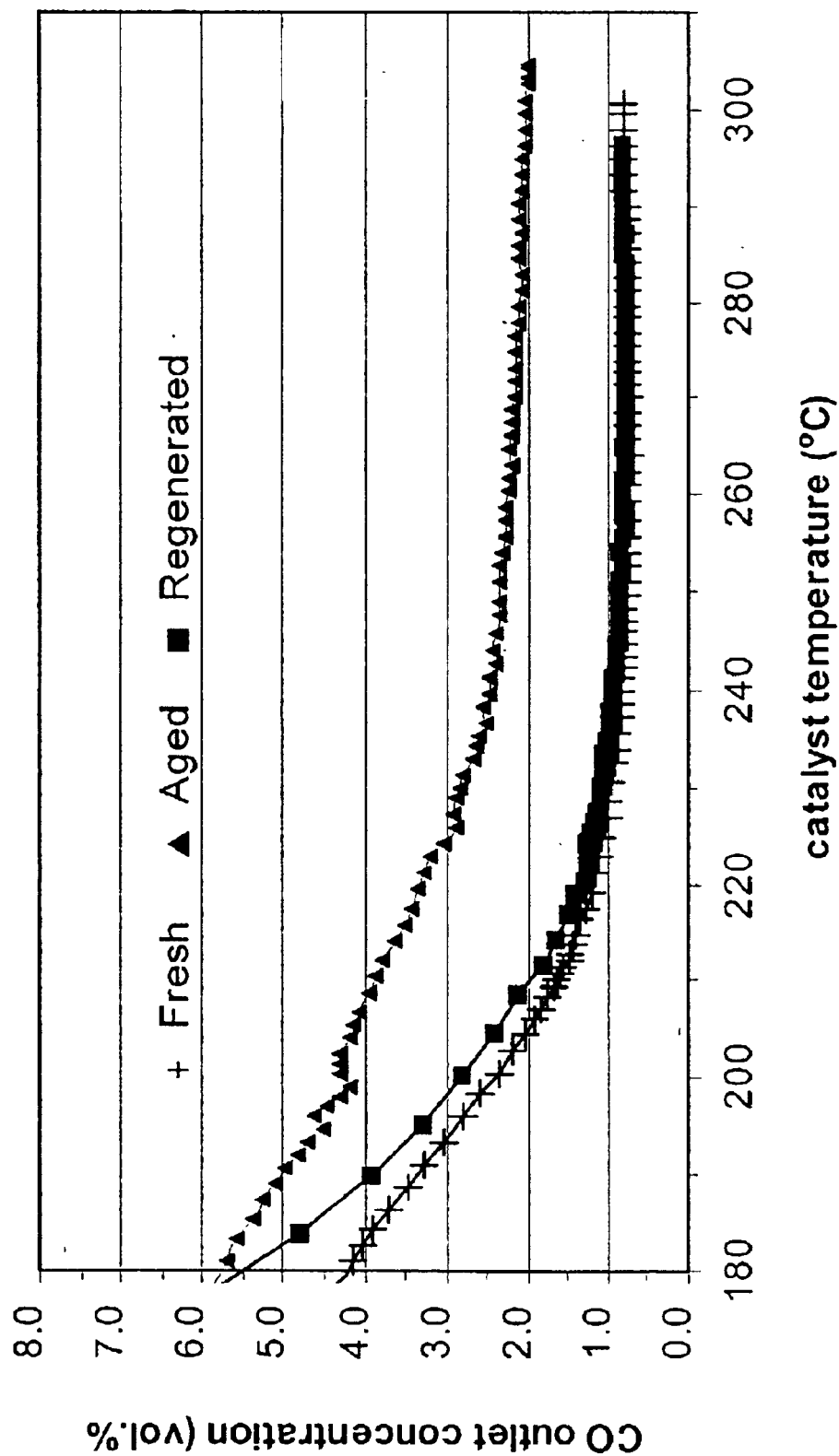
FIG. 6 displays outlet carbon monoxide concentrations obtained upon exposure of a reformate gas stream to an aged sample of a copper-based catalyst, a regenerated sample of the same catalyst and a freshly prepared sample of the same catalyst as a function of catalyst temperature.

The results of the activity measurements represented in FIG. 6 show that the activity of the aged sample was successfully recovered after regeneration, reaching essentially the same level as that of the fresh sample of Catalyst A1. Moreover, the particles of the regenerated catalyst retained their integrity and mechanical strength, so that they can be reused in the fuel processing systems.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. A process for preparing a non-pyrophoric catalyst, comprising:

forming a mixture of a copper precursor and a water-insoluble alumina precursor;

coextruding the mixture;

drying the coextrudate; and calcining the dried coextrudate at a temperature of at least 600° C. to form the non-pyrophoric catalyst;

wherein the non-pyrophoric catalyst comprises about 2 to 20 wt. % of a copper component, and at least 50 wt. % of the copper component is in the form of a copper oxide, aluminum oxide-spinel.

2. The process of claim 1, wherein the non-pyrophoric catalyst comprises at least 80 wt. % of alumina.

3. The process of claim 1, wherein the calcination temperature is at least 650° C.

4. The process of claim 1, wherein the formation of the mixture comprises mulling a paste of a water-insoluble alumina precursor and an aqueous solution of a water-soluble copper salt.

5. The process of claim 1, wherein the process further comprises activating the non-pyrophoric catalyst with a reducing gas stream comprising a reductant component and an inert gas at a temperature of about 150 to 300° C.

6. The process of claim 5, wherein the reductant component comprises hydrogen, carbon monoxide or a combination thereof.

7. The process of claim 5, wherein the reducing gas stream is substantially dry.

8. The process of claim 5, wherein the process further comprises passivating the non-pyrophoric catalyst with a gas stream comprising oxygen and an inert gas at a temperature below 50° C.

9. The process of claim 8, wherein the gas stream comprising oxygen and the inert gas is substantially dry.

10. The process of claim 1, further comprising the step of adding a porous structure modifier to at least one of the copper precursor, the water-insoluble alumina precursor, and the mixture thereof.

11. The process of claim 10, wherein the porous structure modifier is wood flour.

12. A process for activating a non-pyrophoric catalyst, comprising:

(a) contacting the non-pyrophoric catalyst comprised of a mixture of a copper precursor and a water-insoluble alumina precursor with a reducing gas stream comprising a reductant component and an inert gas at a temperature of about 150 to 300° C.; and (b) passivating the reduced non-pyrophoric catalyst with a gas stream comprising oxygen and an inert gas at a temperature below 50° C.;

wherein the non-pyrophoric catalyst comprises about 2 to 20 wt. % of a copper component, and at least 50 wt. % of the copper component is in the form of a copper oxide, aluminum oxide-spinel.

13. The process of claim 12, wherein the reductant component of (a) comprises hydrogen, carbon monoxide or a combination thereof.

14. The process of claim 12, wherein the reducing gas stream of (a) is substantially dry.

15. The process of claim 12, wherein the gas stream of (b) is substantially dry.

* * * * *